(12) United States Patent
Beyerlein et al.

(10) Patent No.: US 6,185,662 B1
(45) Date of Patent: Feb. 6, 2001

(54) HIGH AVAILABILITY ASYNCHRONOUS COMPUTER SYSTEM

(75) Inventors: Ruth Beyerlein, Ottawa; Brian N. Baker, Dunrobin; Terry E. Newell, Kanata, all of (CA)

(73) Assignee: Nortel Networks Corporation, Montreal (CA)

( * ) Notice: Under 35 U.S.C. 154(b), the term of this patent shall be extended for 0 days.

(21) Appl. No.: 08/996,171

(22) Filed: Dec. 22, 1997

(51) Int. Cl.[7] .................................................. G06F 12/00
(52) U.S. Cl. ........................ 711/147; 711/148; 711/167; 711/170
(58) Field of Search ..................... 711/114, 141, 711/147, 148, 167, 146, 170; 714/11, 12

(56) References Cited

U.S. PATENT DOCUMENTS

| | | | |
|---|---|---|---|
| 4,995,040 | 2/1991 | Best et al. ............................. | 714/797 |
| 5,258,982 | 11/1993 | Britton et al. ........................ | 370/408 |
| 5,495,570 * | 2/1996 | Heugel et al. ......................... | 714/11 |
| 5,546,582 | 8/1996 | Brockmeyer et al. ................ | 709/300 |
| 5,615,403 | 3/1997 | Bissett et al. .......................... | 710/61 |
| 5,625,795 * | 4/1997 | Sakakura et al. ..................... | 711/148 |
| 5,651,133 * | 7/1997 | Burkes et al. ........................ | 711/114 |
| 5,692,192 * | 11/1997 | Sudo ..................................... | 711/147 |
| 5,708,795 * | 1/1998 | Funaki et al. ......................... | 711/167 |
| 5,761,728 * | 6/1998 | Saito et al. ............................ | 711/147 |
| 5,860,109 * | 1/1999 | Hagersten et al. .................... | 711/146 |
| 5,860,126 * | 1/1999 | Mittal ................................... | 711/167 |
| 5,890,007 * | 3/1999 | Zinguuzi .............................. | 711/147 |
| 5,895,492 * | 4/1999 | Greenspan et al. .................. | 711/147 |
| 5,933,857 * | 8/1999 | Brewer et al. ....................... | 711/202 |
| 5,950,228 * | 9/1999 | Scales et al. ......................... | 711/148 |

FOREIGN PATENT DOCUMENTS

WO 95/10805   4/1995   (WO) .

* cited by examiner

Primary Examiner—John W. Cabeca
Assistant Examiner—Fred F. Tzeng (57) ABSTRACT

A method and apparatus for receiving status information from shared logical memory modules in a computer system including redundant memory. The status information includes whether the shared logical memory modules are in a transitional state and the number of logical memory modules in the mirror set. When shared logical memory modules are added or removed from redundant memory they go through a transitional state when the memory card may respond to a request for data held on the card, but that data may be unreliable. Checking this status information allows better error checking of data and fault detection of the shared logical memory module.

14 Claims, 3 Drawing Sheets

| STATE | DESCRIPTION |
|---|---|
| 0 | INVALID |
| 1 | A SET CONSISTING OF ONE MODULE |
| 2 | A SET CONSISTING OF TWO MODULES |
| 3 | A SET CONSISTING OF THREE MODULES |
| 4 | 1-UDATE |
| 5 | 2-UPDATE |
| 6 | INVALID |
| 7 | INVALID |

TABLE 1 - SET MODE

FIG. 3

| 1 | 2, 2 | 1-U, 1 | 1-U, 2 |
|---|---|---|---|
| 2, 1-U | 1-U, 1-U, 2 | 1-U, 1-U, 3 | 1-U, 3, 1-U |
| 1-U, 3, 3 | 3, 3, 3 | 3, 1-U, 1-U | 3, 1-U, 3 |
| 3, 2-U, 3 | 3, 2-U, 2 | 2, 2-U, 2 | 2, 2-U, 3 |
| 2-U, 2, 2 | 2-U, 2, 3 | 2-U, 3, 2 | 2-U, 3, 3 |
| 3, 3, 2-U | 2, 3, 2-U | 3, 2, 2-U | 3, 3, 1-U |
| 1, 1-U | 2, 1-U, 1-U | 2, 2, 2-U | 1-U, 2, 1-U |

TABLE 2 - LEGAL MIRROR MODE SEQUENCES

FIG. 4

| MIRROR SET MODE OF EXISTING LOGICAL MEMORY MODULE | MIRROR SET MODE OF 1ST LOGICAL MEMORY MODULE TO BE ADDED | MIRROR SET MODE OF 2ND LOGICAL MEMORY MODULE TO BE ADDED | COMMENT |
|---|---|---|---|
| 1 | (MDL DISABLED) | (MDL DISABLED) | STARTING CONDITION |
| 1 | 1-UPDATE | (MDL DISABLED) | INTERMEDIATE STATE |
| 2 | 1-UPDATE | (MDL DISABLED) | INTERMEDIATE STATE |
| 2 | 1-UPDATE | 1-UPDATE | INTERMEDIATE STATE |
| 3 | 1-UPDATE | 1-UPDATE | COPY MEMORY BY READ/WRITE BACK MARCH |
| 3 | 3 | 1-UPDATE | INTERMEDIATE STATE |
| 3 | 3 CHANGE MDL TO LOGICAL MEMORY MODULE | 3 | STATE AFTER MEMORY HAS BEEN COPIED |

TABLE 3 - ADDING TWO LOGICAL MEMORY MODULES AT ONCE

HIGH AVAILABILITY ASYNCHRONOUS COMPUTER SYSTEM

FIELD OF THE INVENTION

The present invention relates to a high availability asynchronous computer system and is particularly concerned with a system employing redundant, shared memory.

BACKGROUND OF THE INVENTION

The present invention relates to a high availability or fault tolerant memory system for a computer system. Such a computer system may be employed in telecommunications network switches, where high availability and fault tolerance is required.

In such memory systems, memory is often duplicated in shadow or mirror shared memory cards so that system performance is not halted or degraded by an error or fault in one shared memory card. It may be necessary in these systems to discover when a shared memory card has an error or fault and to diagnose the error or fault. As well, the systems need the capability to add or remove redundant shared memory cards, in order to enhance fault tolerance or eliminate excessive redundancy.

A common difficulty with systems having redundant shared memory is keeping track of how many redundant copies of data are stored and allowing a variable number of redundant copies to be stored. Many systems require a fixed number of responses to all memory requests. This reduces system flexibility and fault tolerance.

U.S. Pat. No. 4,995,040 issued Feb. 19, 1991 to Best et al. discloses a fault tolerant, fail-safe computer system including a management unit and buffer to manage asynchronous redundant digital messages, to sort the redundant messages and to compare redundant messages. The messages are compared by a majority voting scheme. The system disclosed by Best may provide high integrity but is unlikely to provide high availability or high reliability.

SUMMARY OF THE INVENTION

An object of the present invention is to provide a high availability asynchronous memory system. A benefit of the present invention is that it allows the mirror set of redundant logical memory modules to have a variable number of logical modules. This increases system flexibility and fault tolerance.

In one aspect there is provided a method for accessing mirrored shared logical memory modules for a read including sending a memory request for a read to an interface from a requester and then to the shared logical memory modules; formulating a reply at each shared logical memory module indicating a size of a mirror set, where the mirror set comprises the shared logical memory modules; formulating the reply at each shared logical memory module so as also to indicate whether each shared logical memory module is in a transitional state; formulating the reply at each shared logical memory module so as to combine indications of the size of the mirror set and indications whether each shared logical memory module is in a transitional state into a set-mode indicator; sending each reply to the interface; deriving at the interface, from one or more replies, a second message; and forwarding the second message to the requester from the interface.

In another aspect there is provided a method for accessing mirrored shared logical memory modules for a read including sending a memory request for a read to an interface and then to the shared logical memory modules from a requester; starting timers when the memory request is sent; formulating a reply at each shared logical memory module indicating whether each shared logical memory module is in a transitional state; formulating the reply at each shared logical memory module so as also to include a data component; sending each reply to the interface; deriving at the interface, from one or more replies, a second message; including a data component of one reply in the second message if each shared logical memory module is not in a transitional state; including a data component of one reply in the second message, if the timers have expired; and forwarding the second message to the requester from the interface.

In another aspect there is provided a method for accessing mirrored shared logical memory modules for a read including sending a memory request for a read to an interface and then to the shared logical memory modules from a requester; formulating a reply at each shared logical memory module indicating whether each shared logical memory module is in a transitional state; sending each reply to the interface; deriving at the interface, from one or more replies, a second message; including a data component of one reply in the second message if each shared logical memory module is not in a transitional state; forwarding the second message to the requester from the interface; and initiating an error handler if a comparison of the replies indicates an error condition.

In another aspect there is provided a method for accessing mirrored shared logical memory modules for a read including sending a memory request for a read to an interface from a requester and then to the shared logical memory modules; formulating a reply at each shared logical memory module indicating a size of a mirror set, where the mirror set comprises the shared logical memory modules; formulating the reply at each shared logical memory module so as also to include a data component; sending each reply to the interface; deriving at the interface, from one or more replies, a second message; including a data component of one reply in the second message if the size of the mirror set, as indicated in the one reply is valid; forwarding the second message to the requester from the interface; and initiating an error handler if a comparison of the replies indicates an error condition.

In another aspect there is provided a method for accessing mirrored shared logical memory modules for a read including sending a memory request for a read to an interface from a requester and then to the shared logical memory modules; formulating a reply at each shared logical memory module indicating a size of a mirror set, where the mirror set comprises the shared logical memory modules; formulating the reply at each shared logical memory module so as also to include a data component; sending each reply to the interface; deriving at the interface, from one or more replies, a second message; including a data component of one reply in the second message if the number of replies received is equivalent to the size of the mirror set; forwarding the second message to the requester from the interface; and initiating an error handler if a comparison of the replies indicates an error condition.

In another aspect there is provided a method for accessing mirrored shared logical memory modules for a read including sending a memory request for a read to an interface from a requester and then to the shared logical memory modules; formulating a reply at each shared logical memory module indicating a size of a mirror set, where the mirror set comprises the shared logical memory modules; formulating the reply at each shared logical memory module so as also to indicate whether each shared logical memory module is in a transitional state; sending each reply to the interface; deriving at the interface, from one or more replies, a second message; forwarding the second message to the requester from the interface; and initiating an error handler if a comparison of the replies indicates an error condition.

In another aspect there is provided a method for adding a new logical memory module to a mirror set, said mirror set having a mirror set logical address range, said method including (a) setting a status code of a new logical memory module to a transitional value, said new logical memory module having a logical memory module logical address range, said logical memory module logical address range being equivalent in range to said mirror set logical address range, (b) changing an indication of a size of said mirror set at existing logical memory modules to a destination set size, (c) performing a read/write march along said mirror set logical address range and (d) setting an indication of a size of said mirror set at said new logical memory module to the destination set size.

In another aspect there is provided a method for removing a given shared logical memory module from a mirror set including changing said given shared logical memory module to a transitional state, changing an indication of a size of said mirror set at remaining shared logical memory modules to a destination set size and disabling said given shared logical memory module.

BRIEF DESCRIPTION OF DRAWINGS

The invention will be further understood with the following description with references to the drawings in which.

DETAILED DESCRIPTION OF THE PREFERRED EMBODIMENTS

Figure 1:
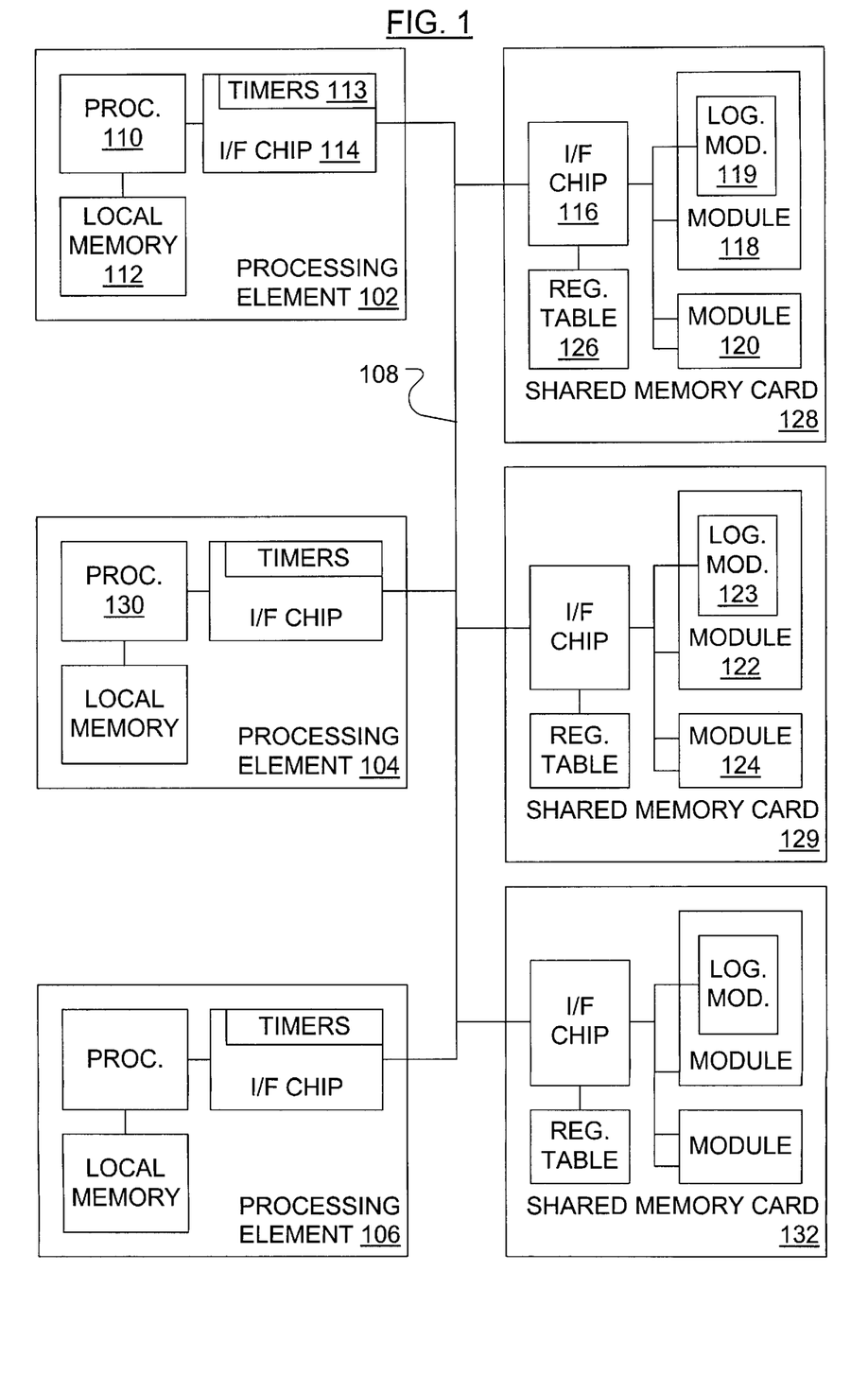
FIG. 1 is a schematic view of a computer system in accordance with an embodiment of the present invention.

The preferred embodiment of a fault-tolerant, asynchronous, computer system allows multiple copies of stored memory to be maintained, thus providing a back-up in case of failure of one copy. Such a system is illustrated in FIG. 1. In the preferred embodiment there are four main components: processing elements 102, 104; shared memory cards 128, 129, 132; input/output element 106; and interconnect 108. Processing elements 102, 104 include a processor 110, local memory 112 associated with the processor 110, and a processing element interface chip 114. The processing element interface chip 114 transmits or receives data in the form of frames from the interconnect 108. A frame is a structured message that contains well-defined information in particular locations within the frame. Data may be read from or written to shared memory cards 128, 129, 132 by processing elements or input/output elements. Shared memory cards have a memory interface chip 116, memory card register table 126 and physical memory modules 118, 120, 122, 124. The system shown in FIG. 1 is illustrative only and typically there will be a variable number of processing elements, shared memory cards, and input/output elements. As well, processing elements such as 102 and input/output elements such as 106 function in the same manner in respect of making a memory request, so that when the phrase processing element is used hereafter with respect to making a memory request it should be understood to encompass a memory request by either processing or input/output elements.

In the preferred embodiment, each shared memory card contains a number of logical memory modules. Each logical memory module has a programmable start and end address range. A single memory card will not have more than one logical memory module with the same address range. The memory card register table 126 of memory card 128 contains a mapping between logical memory address ranges and physical memory addresses used for accessing physical memory modules, such as physical memory module 118.

When a shared memory card is initially connected to the interconnect 108, the shared memory card is in a disabled state. In the preferred embodiment, the processing element is aware that the shared memory card has been connected to the interconnect 108.

A memory request is a message from a requester such as processor 110 requesting access of data, such as a read or write, of data that is located at a particular logical memory address. The requester could also be a pre-fetcher or additional pipelines. When memory requests are transmitted onto the interconnect 108, there can be multiple requests and responses occurring simultaneously. There may be overlap and misordering between the requests and responses. A transaction identifier is added by the processing element interface chip 114 to the frame containing the request in order to keep track of requests and responses. Contention between simultaneous requests must be managed. A system providing such contention management is described in U.S. patent application 08/774,548 titled "Shared Memory Control Algorithm for Mutual Exclusion and Rollback", applicants T. E. Newell et al., filed Dec. 30, 1996 which is hereby incorporated by reference for all purposes.

One aspect of the invention deals with the means by which memory requests are made from a processing to a shared memory card on the interconnect. In the preferred embodiment, the interconnect operates in a point to multi-point fashion. In other words, the processing element that sends out a memory request will be connected to each of the shared memory cards on the interconnect. Thus, it is possible that more than one shared memory card may respond to any given memory request. This is likely to happen, as there is mirror memory set up to help ensure system availability and fault tolerance. A mirror memory set comprises multiple copies of the same data, each copy having the same logical address. The mirror set size is the number of copies of the same data. A mirror set of the memory is set up on the system, so that if there is a fault in one shared memory card, the processing element can refer to other responses to the same memory request in order to attempt to continue processing, with minimal interruption or error, despite the fault.

The method by which the memory requests are made for a read from a logical shared memory module comprises the following steps:

Step 1

The requester such as processor 110 determines that a memory request is needed.

Step 2

The requester such as processor 110 signals to the processing element interface chip 114 that a memory request is required.

Step 3

The processing element interface chip 114 assembles the request by constructing a frame containing data showing the frame type (such as shared memory request), a transaction identifier, an identifier of the originating processing or input/output element, a logical memory address, a read code, and status flags. Processing element interface chip 114 saves information from the frame for later comparison with responses to this memory request.

Step 4

The memory request is placed on the interconnect 108 by the processing element interface chip 114 where it is transmitted to all the shared memory cards 128, 129, 132 on the interconnect 108. When the request is sent out, timers 113 are started in order to detect error conditions such as a failure to reply to the memory request.

Step 5

Figure 2:
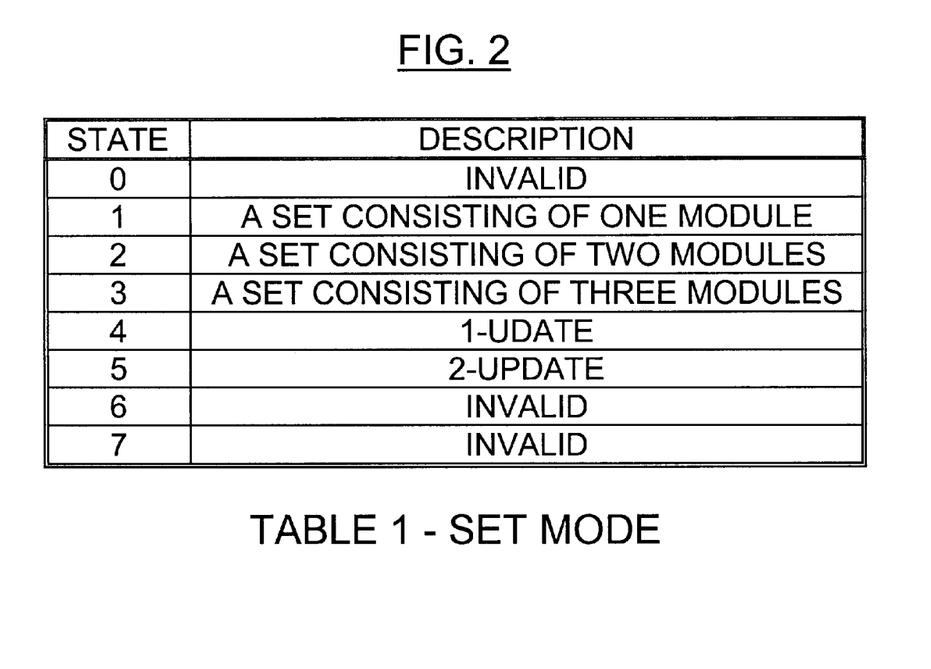
FIG. 2 contains Table 1 which lists set mode values in accordance with an embodiment the present invention.

A shared memory interface chip 116 on the shared memory card 128 receives the request. The shared memory interface chip 116 checks the memory card register table 126, to see if a logical memory module 119 with the logical address contained in the request is on shared memory card 128. If the shared memory card 128 does have the logical address, the shared memory interface chip 116 queues the request for execution. This checking is performed at all memory cards connected to interconnect 108. If memory card register table 126 does not have the logical address, the shared memory interface chip 116 discards the request. When the request is executed, a data component is read from the logical memory address. After the request is executed, a reply frame is generated which contains a data component, which is data stored at the logical address specified in the memory request; a destination identifier which is the identifier of the processing element which made the memory request; the transaction identifier from the memory request frame; the set mode of the responding memory module taken from Table 1, wherein the valid values for the set mode in the preferred embodiment are one module, two modules, three modules, one-update, and two-update; the identifier of the shared memory card; and other status codes. The set mode is a type of status code that indicates when a shared memory card is in a transitional state and that also indicates how many responses the originating processing element should expect to receive (the mirror set size). The reply is then transmitted by the shared memory interface chip 116 to the interconnect 108.

Step 6

The replies are received by the processing element interface chip 114. As each accepted reply with a particular transaction identifier comes in, it is compared with the previous replies with the same transaction identifier and checked for errors. If the combination of set modes from the responses form a valid set, then all elements of the mirror set have replied and the memory access is complete.

The processing element interface chip 114 indicates an error if any of the following conditions are detected:

(a) The timers 113 expire before the replies are received from all members of the set. A timeout initiates an error handler. A timeout is a strong indication that there is a hardware fault with one of the shared memory cards 128, 129, 132.

(b) Those parts of the replies that are directly compared, such as the data component for the processor, do not match.

(c) An error indicator is contained in one or more of the memory replies. The errors can include the status of the shared memory cards 128, 129, 132 and other error indicators.

(d) The processing element interface chip 114 reads the transaction identifier returned as part of the reply, checks it against a table of valid transaction identifier numbers and concludes it is invalid.

(e) The processing element interface chip 114 checks the set mode and determines it is not a valid mode, as shown in Table 1.

Figure 3:
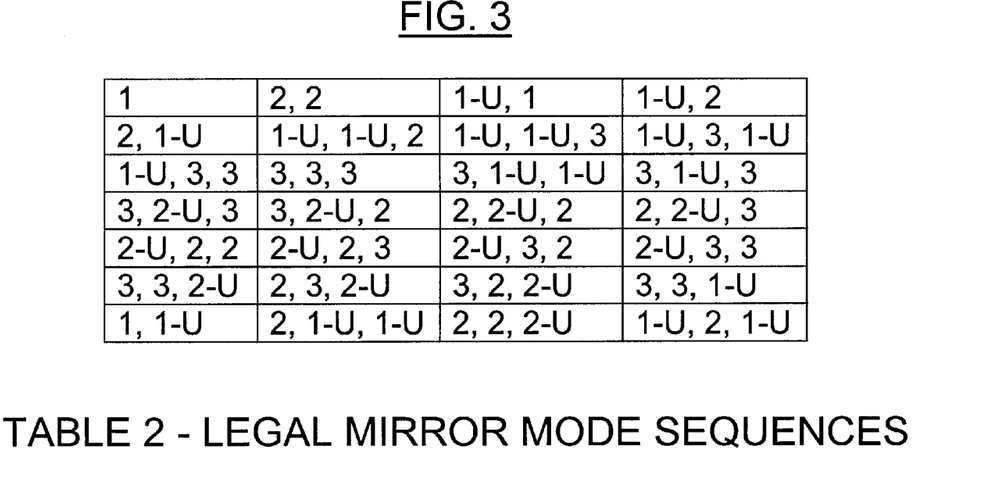
FIG. 3 contains Table 2 which lists legal Mirror Mode Sequences in accordance with an embodiment of the present invention.

(f) The combination of set modes from the replies with the same transaction identifier do not form a valid set. Table 2 shows the legal combinations of set modes.

Step 7

When the processing element interface chip 114 receives a reply it prepares a second message for forwarding to the requester such as processor 110. The second message is derived from the reply and may contain the data component located at the logical memory address in the memory reply, a status or error code, or some status code derived from the data or status codes or both.

The processing element interface chip 114 operates in two distinct modes, fast forward and safe mode, which are discussed below.

In safe mode, the processing element interface chip 114 collects all replies before forwarding the data component to the requester such as processor 110. This prevents the requester such as processor 110 from proceeding until it is certain that no errors were found in step 6.

In fast forward mode, the data component from the first reply that contains no error and is not in a transitional state is forwarded to the requester such as processor 110 immediately. The processing element interface chip 114 stores the reply, and ensures the set modes from all replies with the same transaction identifier form a valid combination and that there are no other errors.

The operation in fast forward mode can be significantly faster, but the requester such as processor 110 must be prepared to correct the problem if an error is detected after the data component from the first reply has been forwarded. The correction is controlled by the error handler and may be by roll-back, correction of the memory system if the error was in the memory system, or by withdrawing the incorrect data from the system.

A benefit of the present invention is that it allows the mirror set to have a variable number of logical modules. This increases system flexibility and fault tolerance.

The method by which the memory requests for a write are made comprises the following steps:

Step 1

The requester such as processor 110 determines that a memory request for a write is needed.

Step 2

The requester such as processor 110 signals to the processing element interface chip 114 that a memory request for a write is required.

Step 3

Processing element interface chip 114 sends an acceptance message back to requester such as processor 110 that it has accepted the write request.

Step 4

The processing element interface chip 114 assembles the memory request by constructing a frame containing data showing the frame type (such as shared memory request), a transaction identifier, an identifier of the originating processing or input/output element, a logical memory address, a write code, and status flags, and the data to be written to the logical memory address. Processing element interface chip 114 saves information from the request frame for later comparison with responses to the memory request.

Step 5

The memory request is placed on the interconnect 108 by the processing element interface chip 114 where it is transmitted to all the shared memory cards 128, 129, 132 on the interconnect 108. When the request is sent out, timers 113 are started in order to detect error conditions such as a failure to reply to the memory request.

Step 6

A shared memory interface chip 116 on the shared memory card 128 receives the request. The shared memory interface chip 116 checks the memory card register table 126, to see if a logical memory module 119 with the logical address contained in the request is on shared memory card 128. If the shared memory card 128 does have the logical address, the shared memory interface chip 116 queues the request for execution. This checking is performed at all memory cards connected to interconnect 108. If memory card register table 126 does not have the logical address, the shared memory interface chip 116 discards the request. When the request is executed the data is written to the logical memory address. After the request is executed, a reply frame is generated which contains a destination identifier which is the identifier of the processing element which made the memory request; the transaction identifier from the memory request frame; the set mode of the responding memory module taken from Table 1, wherein the valid values for the set mode in the preferred embodiment are one module, two modules, three modules, one-update, and two-update; the identifier of the shared memory card; and other status codes. The set mode is a type of status code that indicates when a shared memory card is in a transitional state and that also indicates how many responses the originating processing element should expect to receive (the mirror set size). The reply is then transmitted by the shared memory interface chip 116 to the interconnect 108.

Step 7

The replies are received by the processing element interface chip 114. As each accepted reply with a particular transaction identifier comes in, it is compared with the previous replies with the same transaction identifier and checked for errors. If the combination of set modes from the responses form a valid set, then all elements of the mirror set have replied and the memory access is complete.

The processing element interface chip 114 indicates an error if any of the following conditions are detected:

(d) The timers 113 expire before the replies are received from all members of the set. A timeout is a strong indication that there is a hardware fault with one of the shared memory cards 128, 129, 132.

(e) Those parts of the replies that are directly compared, do not match.

(f) An error indicator is contained in one or more of the memory replies. The errors can include the status of the shared memory cards 128, 129, 132 and other error indicators.

(d) The processing element interface chip 114 reads the transaction identifier returned as part of the reply, checks it against a table of valid transaction identifier numbers and concludes it is invalid.

(e) The processing element interface chip 114 checks the set mode and determines it is not a valid mode, as shown in Table 1.

(f) The combination of set modes from the replies with the same transaction identifier do not form a valid set. Table 2 shows the legal combinations of set modes.

If an error is indicated an error handler is initiated.

ADDING MIRROR MEMORY MODULES

Another important aspect of the invention is the ability to add or remove mirror logical memory modules from the mirror set. The ability to add new mirror memory or remove it without impacting system operation is an important characteristic. It is also important to be able to move logical memory modules from one mirror set to another, so that mirror elements are not overly concentrated in a subset of logical addresses of the system. This provides the ability to reconfigure the system to the optimal state of reliability.

As described above, when the requester such as processor 110 sends out a memory request, it can receive replies from more than one of shared memory cards 128, 129, 132. Between the time when a mirror logical memory module 119 is disabled and not associated with a logical memory address range and the time when it is fully enabled and is properly and correctly mirroring the other logical memory modules, such as logical memory module 123 associated with the same logical memory address range, the logical memory module is in a transitional state. When a logical memory module is in the transitional state, it is necessary that the processing element interface chip 114 receives a response from that logical memory module but disregards the data generated by that logical memory module in response to a memory request. When mirror memory is added to or removed from association with a logical address range, it is necessary to understand or keep track of the status of the logical memory module being added or subtracted, so that the comparison, matching and error checking performed by the processing element interface chip 114 does not inadvertently compare with or attempt to match responses from a logical memory module that is in a transitional state.

When a logical memory module is added to a mirror set, the following steps occur:

Step 1

The set mode of the logical memory module being added is changed to an update state, such as 1-update or 2-update. The set mode of the logical memory module is changed to the 1-update state, when a simplex mirror memory set is being changed to a duplex set or a triplex set, or to the 2-update state, when a logical memory module is being added to an existing duplex set.

Step 2

The memory card register table 126 is set up with its logical memory address range of the mirror set. A signal is then generated to take the logical memory module 119 from the disabled state to an enabled state.

Step 3

The existing logical module(s) have the set mode changed to the final number of mirror modules in the mirror set. Thus, for a change from simplex to duplex, in other words, changing from one logical memory address range with a mirror set of size one to a mirror set of size two (one redundant), the existing logical module has its set mode changed from 1 to 2; from a simplex to triplex (two redundant), the existing logical module set mode is changed from 1 to 3 and for a duplex to triplex, the existing logical module set mode is changed from 2 to 3.

Step 4

The new logical module 119 has a range of logical addresses stored in table 126 which is the logical address range of the mirror set. The processor 110 initiates a read/write back march through that range of logical addresses. After this is complete the memory in the new logical module 119 is consistent with the memory in the existing logical module(s) in the mirror set.

Step 5

The set mode of the new logical module 119 is changed to the final number of modules in the mirror memory set.

It can be noted that a shortcut exists when moving from the simplex to triplex or, in other words, from one logical memory module in the mirror set to three logical modules in the mirror set. Both the new logical modules are added at that same time and, prior to the read/write back march both the new logical modules are in the 1-update state. The read/write back march then updates both the new logical modules at the same time. After the march, the set mode of one and then the other of the new logical modules is changed to the final number of modules, which in this case is three.

Figure 4:
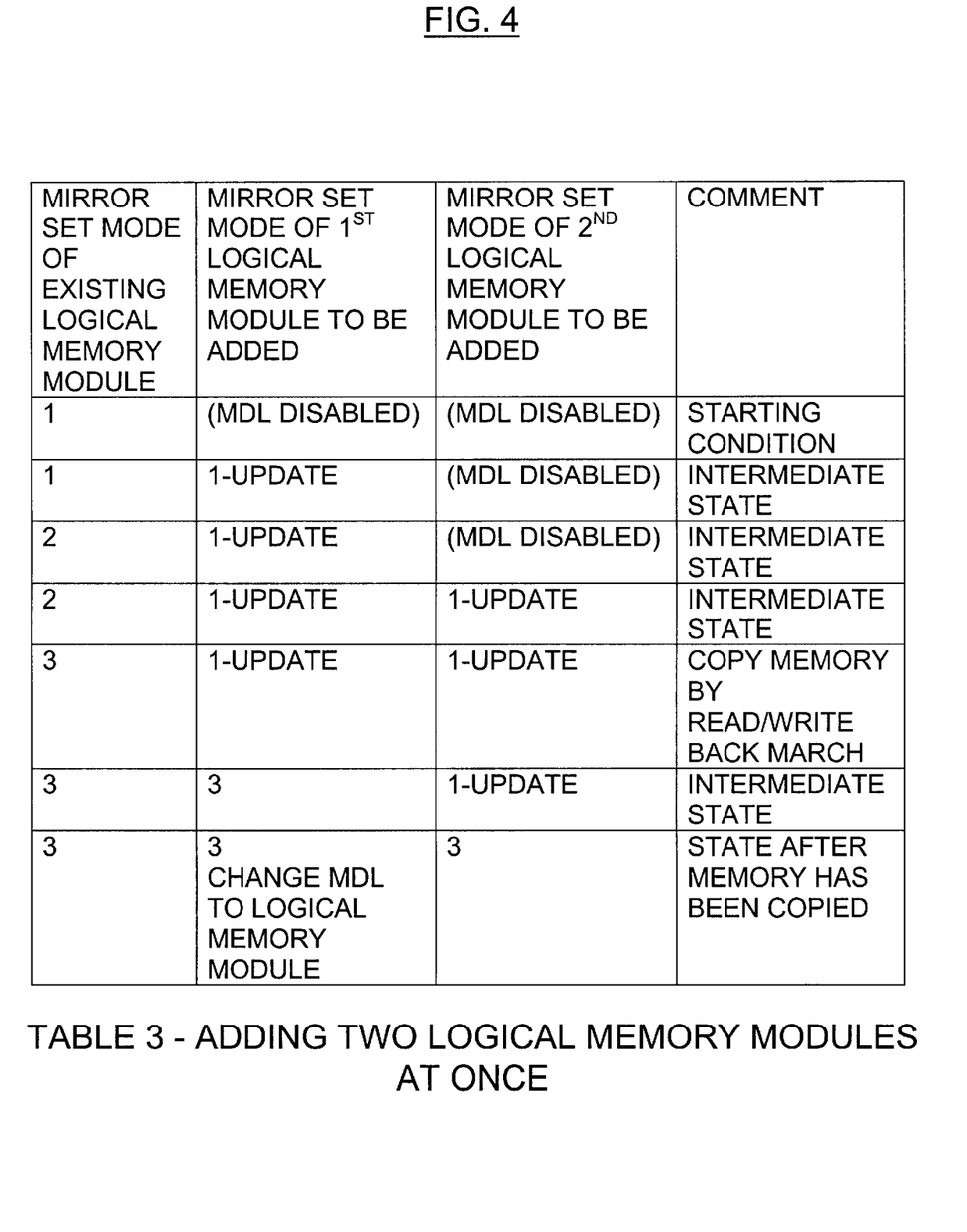
FIG. 4 contains Table 3 which describes a sequence of steps for adding two logical memory modules to a mirror set in accordance with an embodiment of the present invention.

In the preferred embodiment, when moving the mirror set size of the original active module from a mirror set size of one to a mirror set size of three, it is necessary to move through a mirror set size of two to avoid creating a false error condition. This is illustrated in Table 3.

REMOVING MIRROR MEMORY MODULES

When removing shared logical memory modules from a mirror set it is necessary for the logical module to pass through a transitional state where its data component is not actively compared to other responses from other logical memory modules in the mirror set to a memory request. This transitional state is required to allow the various logical memory modules in the mirror set to be changed to the destination set size without reporting errors. Once the remaining logical modules have their set mode indicators set to the destination set size the logical module can be removed.

EXTENSION TO LARGER MIRROR SET SIZES

The preferred embodiment of this invention uses a maximum set size of three. This meets current requirements but the invention is not restricted to a mirror set size of three. The mechanism can be extended to an arbitrarily large mirror set size.

Extension of the maximum allowed set size to the general case of N modules per mirror set is generally straight forward. The extension to an arbitrarily large mirror set size can be done by following the following set of rules:

the set mode field must contain:
N−1 update modes to be included in the mirror mode field labelled 1-U through (N−1)-U according to the previous used naming convention;
codes for mirror set sizes 1 through N;
update mode M−U must be used when adding modules to a set size of M (M active cards in the set) to get any other set size, or when removing module from any set size to get to a size of M;
when adding modules to sets all non-update mode modules must have a mirror set size equal to the destination set size when the copy is performed;
adding modules to a set to go from set size A to set size B (i.e. B>A) requires B−A steps in preparation for copying data starting with A modules in mode A and B−A modules disabled, each step involves adding one to the set size of each module and enabling one more module in A−U update mode such that after the Mth step there are A modules with a set size of A+M, M modules in M−U update mode and B−A−M modules still disabled, after B−A steps (the point where the system is ready to perform the copy) there are A modules in mirror mode B and B−A modules in A−U update mode and a copy of the module can begin. Once the copy is complete the B−A modules in A−U update mode can be changed to set size B and the operation is complete;
when the copy is being performed to add modules to sets all active modules must respond with the set mode bits set to the new set size; and
removing modules to go from a set size of A to a set size of B (i.e. B<A) requires all modules in the set that are to be removed to be placed in update mode B then A−B steps must be performed starting with B modules in mode A and A−B modules in update mode, each step involves reducing the set size by one in each module not in update mode and then disabling one of the modules in update mode, such that after the (A−B) step there are B modules with set size B and A−B modules disabled.

The error checking used to determine which combinations of mirror set sizes and transitional states are valid is summarized by the following rules:
the normal running mode requires all shared logical memory modules in the mirror set to have a mirror set size equal to the number of shared logical memory modules in the mirror set;
a response from a shared logical memory module with the set mode indicating it is in transitional mode is counted as a response but the data is not compared to other responses;
when a response with set mode in update mode M−U is received, there must be at least M modules responding with set mode set to size M; and
in all combinations there must be at least the number of responses coming back as the largest set size.

By defining the set mode sequences during the transitional states, it is possible to ensure that new logical memory modules can be brought into a state consistent with existing logical memory modules in a controlled and predictable fashion.

Numerous modifications, variations and adaptations may be made to particular embodiments of the invention described above without departing from the scope of the invention which is defined in the claims. For example, the number of shared memory cards mirroring a logical address space could be greater than three, causing a corresponding change in valid sets of set modes and a corresponding change in the method for adding or removing redundant memory modules.

What is claimed is:

1. A method for accessing mirrored shared logical memory modules for a read comprising:
sending a memory request for a read to an interface from a requester and then to said shared logical memory modules;
formulating a reply at each shared logical memory module indicating a size of a mirror set, where said mirror set comprises said shared logic memory modules;
formulating said reply at said each shared logical memory module so as also to indicate whether said each shared logical memory module is in a transitional state;
formulating said reply at said each shared logical memory module so as to combine indications of said size of said mirror set and indications whether said each shared logical memory module is in a transitional state into a set-mode indicator;
sending each said reply to said interface;

deriving at said interface, from one or more replies, a second message; and, forwarding said second message to said requester from said interface.

2. The method of claim 1 further comprising:

formulating said reply at said each shared logical memory module so as also to include a data component; and including a data component of one reply in said second message if said set-mode indicator, in said one reply, indicates
a shared logical memory module that formulated said one reply is not in a transitional state; and
said size of said mirror set is valid.

3. The method of claim 2 further comprising initiating an error handler if a comparison of said replies indicates an error conditioner.

4. The method of claim 1 further comprising:

formulating said reply at said each shared logical memory module so as also to include a data component; and including a data component of one reply in said second message if said set-mode indicators form a valid set.

5. The method of claim 4 further comprising initiating an error handler if a comparison of said replies indicates an error condition.

6. A method for accessing mirrored shared logical memory modules for a read comprising:

sending a memory request for a read to an interface and then to said shared logical memory modules from a requester;

starting timers when said memory request is sent;

formulating a reply at each shared logical memory module indicating whether said each shared logical memory module is in a transitional state;

formulating said reply at said each shared logical memory module so as also to include a data component;

sending each said reply to said interface;

deriving at said interface, from one or more replies, a second message;

including a data component of one reply in said second message if said each shared logical memory module is not in a transitional state;

including a data component of one reply in said second message, if said timers have expired; and forwarding said second message to said requester from said interface.

7. The method of claim 6 further comprising initiating an error handler if a comparison of said replies indicates an error condition.

8. A method for accessing mirrored shared logical memory modules for a read comprising:

sending a memory request for a read to an interface and then to said shared logical memory modules from a requester;

formulating a reply at each shared logical memory module indicating whether said each shared logical memory module is in a transitional state;

sending each said reply to said interface;

deriving at said interface, from one or more replies, a second message;

including a data component of one reply in said second message if said each shared logical memory module is not in a transitional state;

forwarding said second message to said requester from said interface; and initiating an error handler if a comparison of said replies indicates an error condition.

9. A method for accessing mirrored shared logical memory modules for a read comprising:

sending a memory request for a read to an interface from a requester and then to said shared logical memory modules;

formulating a reply at each shared logical memory module indicating a size of a mirror set, where said mirror set comprises said shared logical memory modules;

formulating said reply at said each shared logical memory module so as also to include a data component;

sending each said reply to said interface;

deriving at said interface, from one or more replies, a second message;

including a data component of one reply in said second message if said size of said mirror set, as indicated in said one reply is valid;

forwarding said second message to said requester from said interface; and initiating an error handler if a comparison of said replies indicates an error condition.

10. A method for accessing mirrored shared logical memory modules for a read comprising:

sending a memory request for a read to an interface from a requester and then to said shared logical memory modules;

formulating a reply at each shared logical memory module indicating a size of a mirror set, where said mirror set comprises said shared logical memory modules;

formulating said reply at said each shared logical memory module so as also to include a data component;

sending each said reply to said interface;

deriving at said interface, from one or more replies, a second message;

including a data component of one reply in said second message if the number of replies received is equivalent to said size of said mirror set;

forwarding said second message to said requester from said interface; and initiating an error handler if a comparison of said replies indicates an error condition.

11. A method for accessing mirrored shared logical memory modules for a read comprising:

sending a memory request for a read to an interface from a requester and then to said shared logical memory modules;

formulating a reply at each shared logical memory module indicating a size of a mirror set, where said mirror set comprises said shared logical memory modules;

formulating said reply at said each shared logical memory module so as also to indicate whether said each shared logical memory module is in a transitional state;

sending each said reply to said interface;

deriving at said interface, from one or more replies, a second message;

forwarding said second message to said requester from said interface; and initiating an error handler if a comparison of said replies indicates an error condition.

12. A method for adding a new logical memory module to a mirror set, said mirror set having a mirror set logical address range, said method comprising:

(a) setting a status code of a new logical memory module to a transitional value, said new logical memory module having a logical memory module logical address range;

said logical memory module logical address range being equivalent in range to said mirror set logical address range;

(b) changing an indication of a size of said mirror set at existing logical memory modules to a destination set size;

(c) performing a read/write march along said mirror set logical address range; and (d) setting an indication of a size of said mirror set at said new logical memory module to the destination set size.

13. The method of claim 12 further comprising:

sending a message to said new logical memory module to set said logical memory module logical address range; and after (d), re-setting said status code of said new logical memory module to a non-transitional value.

14. A method for removing a given shared logical memory module from a mirror set comprising:

changing said given shared logical memory module to a transitional state;

changing an indication of a size of said mirror set at remaining shared logical memory modules to a destination set size; and disabling said given shared logical memory module.

* * * * *